US012010493B1

United States Patent
Wong et al.

(10) Patent No.: US 12,010,493 B1
(45) Date of Patent: Jun. 11, 2024

(54) VISUALIZING SPATIAL AUDIO

(71) Applicant: EmbodyVR, Inc., San Mateo, CA (US)

(72) Inventors: Willy Wai-Lik Wong, Tokyo (JP);
Marielle Venita Jakobsons, Oakland, CA (US); Nikhil Ratnesh Javeri, Santa Clara, CA (US)

(73) Assignee: EMBODYVR, INC., San Mateo, CA (US)

( * ) Notice: Subject to any disclaimer, the term of this patent is extended or adjusted under 35 U.S.C. 154(b) by 0 days.

(21) Appl. No.: 17/011,710

(22) Filed: Sep. 3, 2020

Related U.S. Application Data

(60) Provisional application No. 62/934,940, filed on Nov. 13, 2019.

(51) Int. Cl.
*H04R 5/027* (2006.01)
*G06F 16/68* (2019.01)
*H04R 5/04* (2006.01)

(52) U.S. Cl.
CPC .............. *H04R 5/027* (2013.01); *G06F 16/68* (2019.01); *H04R 5/04* (2013.01)

(58) Field of Classification Search
CPC ............ H04R 5/027; H04R 5/04; G06F 16/68
See application file for complete search history.

(56) References Cited

U.S. PATENT DOCUMENTS

| | | | | |
|---|---|---|---|---|
| 5,212,733 A | * | 5/1993 | DeVitt | G10H 1/0008 381/119 |
| 5,286,908 A | * | 2/1994 | Jungleib | G10H 1/0008 84/478 |
| 5,812,688 A | * | 9/1998 | Gibson | G10H 1/0008 381/119 |
| 8,068,105 B1 | * | 11/2011 | Classen | H04S 7/40 345/440 |
| 2004/0030425 A1 | * | 2/2004 | Yeakel | H04H 60/04 700/94 |
| 2007/0233293 A1 | * | 10/2007 | Villemoes | H04S 3/00 700/94 |

(Continued)

OTHER PUBLICATIONS

Seo et al., "Development of Multichannel Sound Scene Visualization Tool with MPEG Surround Multichannel Decoder", 2008, IEEE, electronic PDF, pp. 1-2 (Year: 2008).*

(Continued)

*Primary Examiner* — Daniel R Sellers

(57) ABSTRACT

A multi-sensory spatial audio experience system transforms one or more features of audio data to visualizations and coordinates for presentation of the visualizations with auditory cues of the audio data to create a combination of auditory-visual cues for audio spatialization. The multi-sensory spatial audio experience system presents a graphical depiction of audio source spatial positions with respect to a user depiction via a user interface. The multi-sensory spatial audio experience system determines a spatial feature(s) of input audio data and transforms the audio data spatial feature into visual feature data. In coordination with rendering of the audio data, the multi-sensory spatial audio experience system updates the user interface according to the visual feature data. A user can visually perceive graphical changes in the audio source spatial positions that reinforce the auditory perception of the corresponding audio data.

21 Claims, 11 Drawing Sheets

(56) References Cited

U.S. PATENT DOCUMENTS

| | | | | |
|---|---|---|---|---|
| 2008/0228501 A1* | 9/2008 | Pang | ................. | G10L 19/008 |
| | | | | 704/500 |
| 2009/0182564 A1* | 7/2009 | Beack | ................. | H04S 3/008 |
| | | | | 704/500 |
| 2014/0379108 A1* | 12/2014 | Vesa | ................. | G06F 3/165 |
| | | | | 700/94 |
| 2018/0084367 A1* | 3/2018 | Greff | ................. | H04S 3/02 |

OTHER PUBLICATIONS

"Sound Spatialization and Reverberation", Synthesis Theory, Chapter 11, pp. 451-492.

Pulkki, "Virtual Sound Source Positioning Using Vector Base Amplitude Panning", Audio Engineering Society, Inc. vol. 45, No. 6, Jun. 1997, pp. 456-466.

\* cited by examiner

VISUALIZING SPATIAL AUDIO

CROSS-REFERENCE TO RELATED APPLICATIONS

This application claims the benefit of U.S. Provisional Application No. 62/934,940, filed on Nov. 13, 2019. The entire disclosure of the application referenced above is incorporated herein by reference.

FIELD OF THE DISCLOSURE

The disclosure generally relates to electrical digital data processing and, more particularly, to methods or devices for transmitting, conducting, or directing audio.

BACKGROUND

Sound is part of an immersive virtual environment, contributing to a user's immersion, perception, and performance. Audio spatialization refers to the projection and localization of sound sources in a physical and/or simulated space. Audio spatialization provides a listener with a spatially aware audio experience. Audio spatialization includes audio reproduction systems and algorithms combined to provide a real-time (or near real-time) and interactive rendering for an immersive audio experience in virtual reality scenarios. Audio spatialization processes digital audio to produce spatial audio. Spatial audio incorporating 3-dimensional (3D) audio effects can represent audio's spatial movement with respect to a user and movement of the user's head. Spatial audio enables a listener to perceive that audio is coming from one or more directions or elevations. Different audio types, such as multi-channel audio and object-based audio, can be spatialized to produce spatial audio.

Multi-channel audio generates spatial audio through speakers located around a listener. Multi-channel audio defines audio data for a specific spatial configuration of speakers, such as a number of speakers at eye level, a number of subwoofers, and a number of overhead speakers. For example, 5.1.4 multi-channel audio defines audio data for a specific layout of 10 speakers positioned in the room which include 5 speakers positioned at eye level, 1 subwoofer, and four overhead speakers, where each speaker receives respective audio signals. Audio output by one or more speakers allows the listener to perceive that audio is coming from a certain spatial position. A channel of the audio data is associated with a speaker, and the channel audio data is used by the speaker to generate a spatial audio. Speakers are added or removed to change a listening experience, resulting in scaling up or down the number of channels.

Object-based audio represents audio as an object. Unlike multi-channel audio, audio data associated with object-based audio includes metadata that describes the existence, position, and function of the object. The object represents a virtual audio source which outputs the spatial audio located at a spatial position. The audio data is output to a plurality of speakers so that the listener perceives spatial audio as audio associated with the object coming from a certain spatial position.

BRIEF DESCRIPTION OF THE DRAWINGS

Embodiments of the disclosure may be better understood by referencing the accompanying drawings.

DESCRIPTION

Figure 1:
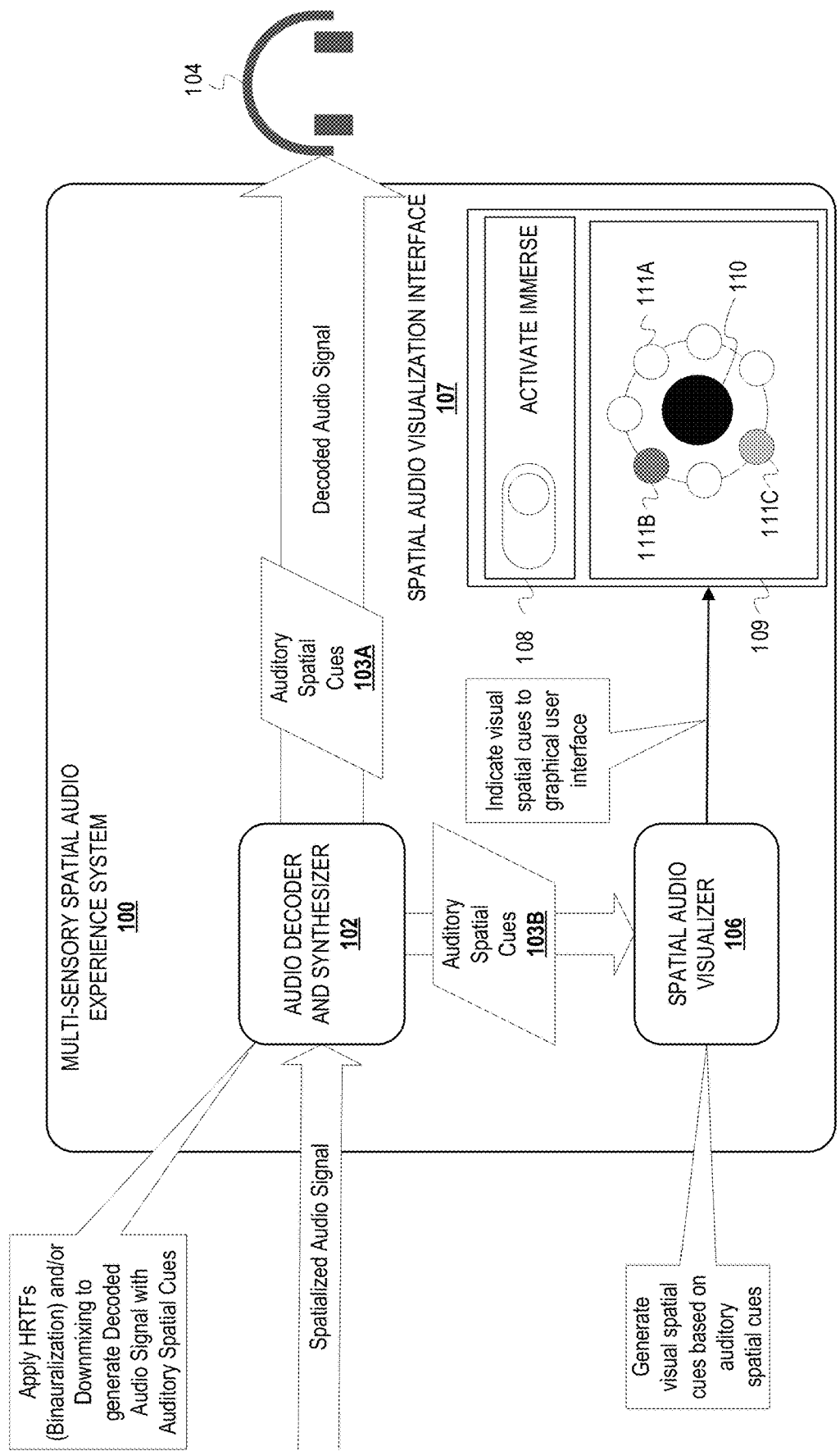
FIG. 1 illustrates an example block diagram of a multi-sensory spatial audio experience system.

The description that follows includes example systems, methods, techniques, and program flows that embody aspects of the disclosure. However, it is understood that this disclosure may be practiced without these specific details. For instance, this disclosure refers to an audio system for visualizing spatial audio in illustrative examples. Aspects of this disclosure can also be used with other applications, such as virtual gaming applications where visualization of spatial audio produced by the application improves user interaction with the computer applications. In other instances, well-known instruction instances, protocols, structures and techniques have not been shown in detail in order not to obfuscate the description.

Overview

Visualizing spatial audio includes depicting a spatial position associated with an audio source. The audio source may correspond to a channel in multi-channel audio or an object in object-based audio. The spatial position may indicate the spatial position of the audio source or a direction from which audio emanates. The visualization of the spatial audio in conjunction with a listener listening to a spatial audio output by a device (e.g., a personal audio delivery device) emphasizes and reinforces spatialization creating an intuitive and accurate mental map of the listener's surroundings. Spatial audio visualization can supplement or reinforce audio cues for audio spatialization. This can be helpful in environments that render audio cues alone insufficient.

The disclosed multi-sensory spatial audio experience system transforms one or more features of audio data to visualizations and coordinates for presentation of the visualizations with auditory cues of the audio data to create a combination of auditory-visual cues for audio spatialization. Reinforcing spatial perception of audio by coupling auditory cues with visual cues leverages multi-sensory intuitive markers that can facilitate interaction and/or reaction in a virtual environment or augmented reality environment. The multi-sensory spatial audio experience system presents a graphical depiction of audio source spatial positions with respect to a user depiction via a user interface. The multi-sensory spatial audio experience system determines a spatial feature(s) of input audio data and transforms the audio data spatial feature into visual feature data. In coordination with rendering of the audio data, the multi-sensory spatial audio experience system updates the user interface according to the visual feature data. A user can visually perceive graphical changes in the audio source spatial positions that reinforces the auditory perception of the corresponding audio data.

In examples, the spatial audio is visualized by a directional wheel or circle displayed on a display screen. The circle has one or more indicators of positions associated with an audio source. In examples, the indicator is placed on a circle, and the center of the circle is indicative of the location of a listener. The indicators are representative of virtual audio sources which produce audio that can be spatialized, and the indicators are depicted as luminescent and/or colored dots. The circle is oriented to represent a plane in which the virtual audio sources are located. The circle may represent a top view projection or a side view projection. In a top view projection, the indicators are located on the azimuthal (left-right) plane. Elevation changes in a top view projection are represented by the color of the indicators. In a side view projection, the indicators represent a sagittal (up-down) plane, and azimuth is represented by the color of the indicators. Further, in some examples, positions associated with audio sources are represented by indicators in four-dimensions where audio occurring in space-time is visualized with the listener's head being the center of a sphere. Changing positions of the indicators on the sphere indicate changes in positions associated with the audio sources in time.

In addition to an indicator being used to represent position associated with an audio source, luminescence or shading of the indicator represents loudness of the audio. For example, a bright indicator or light shading represents a louder audio than a dim or dark indicator. Distance of audio with respect to the listener is represented by the circumference or size of the circle on which the indicator around the listener is located. Closer audio is represented on a contracted circle while audio further away is represented on an enlarged circle. Loudness of the audio may also be represented by the radius of the indicator.

In examples, a multi-sensory spatial audio experience system visualizes audio sources and occurrences. The multi-sensory spatial audio experience system receives, from a digital audio system, or generates spatial audio data from different audio types, such as multi-channel audio or object-based audio. The multi-sensory spatial audio experience system determines, based on the type of the audio data, a position defined by the audio data associated with an audio source. If the audio data is from multi-channel audio, then a channel of the audio data defines an audio source and a position associated with the audio data is the spatial position of the speaker for that channel. If the audio data is from object-based audio, then the audio data defines audio associated with an object, and the position of the object is the position associated with the audio. The multi-sensory spatial audio experience system processes audio data associated with a channel of multi-channel audio or an object of object-based audio with a trigger metric to determine a feature related to the audio, such as loudness. After determining the feature and position associated with the audio, the indicator is then shown on the display screen. The indicator is positioned on the circle to indicate the position associated with the spatial audio with respect to the listener and the feature is shown as a brightness, shading, or radius of the indicator on the display screen. Multiple indicators are mapped on one or more circles on the display screen to indicate positions associated with multiple spatial audios.

Example Illustrations

FIG. 1 illustrates an example block diagram of a multi-sensory spatial audio experience system. A multi-sensory spatial audio experience system 100 includes an audio decoder and synthesizer 102, a spatial audio visualizer 106, and a spatial audio visualization interface 107. The multi-sensory spatial audio experience system 100 can also include a personal audio delivery device 104 or communicate decoded audio to a personal audio delivery device 104 that is not part of the multi-sensory spatial audio experience system 100. While depicted as headphones, the personal audio delivery device 104 may be any type of listening device such as headphones, hearables, earbuds, hearing aids or other ear accessories. The multi-sensory spatial audio experience system 100 includes other components for processing and outputting an audio signal that are not depicted since they are known.

The multi-sensory spatial audio experience system 100 receives a spatialized audio signal. The audio decoder and synthesizer 102 processes the spatialized audio signal, including decoding and synthesizing the spatialized audio signal. The audio decoder and synthesizer 102 may be any device or computer program capable of encoding and/or decoding a digital data stream. The audio decoder and synthesizer 102 may be software implementing algorithms that compress and decompress digital audio data. The audio decoder and synthesizer 102 may also be a device that encodes analog audio into digital signals that can be decoded. The audio decoder and synthesizer 102, or another component, may perform other processing on the received audio signal, such as binauralization, downmixing, decompression, etc. The audio decoder and synthesizer 102 determines auditory spatial cues 103A and 103B from the spatialized audio signal. The auditory spatial cues 103A and 103B allow listeners to determine the location of sounds in space. The auditory spatial cues 103A and 103B may be inter-aural timing differences (ITDs), inter-aural loudness differences (ILDs), or other known spatial cues. The auditory spatial cues 103A and 103B provide the data structure for the information included in the spatialized audio signals. For object-based audio, the auditory spatial cues 103A and 103B may be the metadata associated with the object-based audio.

The auditory spatial cues 103A constitute part of the decoded audio signal that will be communicated to the device 104 for rendering. The audio decoder and synthesizer 102 generates decoded audio signals by applying Head Related Transfer Functions (HRTFs) and/or downmixing the spatialized audio signal. The decoded audio signals include auditory spatial cues 103A that are communicated to the device 104. When applying HRTFs, the audio decoder and synthesizer 102 binauralizes the spatialized audio signals to generate decoded audio signals that include information that describes how an ear receives sound from a sound source. For downmixing, the audio decoder and synthesizer averages the data from each of the received channels of data to determine a position associated with a perception of audio position.

The audio decoder and synthesizer 102 communicates the auditory spatial cues 103B to the spatial audio visualizer 106. The spatial audio visualizer 106 generates visual spatial cues based on the auditory spatial cues 103B. Generating spatial cues in the visual domain based on spatial cues in the auditory domain will vary depending upon the type of auditory spatial cues. In the case of HRTFs, the spatial audio visualizer 106 can determine first person based cartesian coordinates and a polar coordinate from the HRTFs and map those to graphical representations of audio source positions. The spatial audio visualizer 106 can also transform or map auditory intensity values indicated in the auditory spatial cues 103B to visual features and values (e.g., colors, shapes, redrawing boundaries, etc.). In the case of channel based auditory cues, the spatial audio visualizer 106 can determine location from an identifier in the auditory spatial cues 103B. The identifier indicates a channel number which correlates to a spatial position. The spatial audio visualizer 106 may also determine location from interaural time difference and the interaural intensity difference and map according to the graphical representations of audio source positions. The spatial audio visualizer 106 can also use the interaural intensity difference indicated in the auditory spatial cues 103B to determine visual features and values. In some embodiments, the spatial audio visualizer 106 may also determine visual features and values with reverberation information indicated in the auditory spatial cues 103B. Each audio feature may directly correspond to a visual feature, multiple visual features may correspond to a single audio feature, or multiple audio features may correspond to a single visual feature. For example, one visual feature may indicate both frequency and time associated with an auditory spatial cue. As another example, multiple visual features may correspond to a single frequency. When multiple visual features correspond to a single audio feature, the spatial audio visualizer 106 determines each visual feature that corresponds to audio intensity and calculates a value for each visual feature based on the audio intensity value.

After generating the visual spatial cues (e.g., position mappings and visual features and values), the spatial audio visualizer 106 indicates the visual spatial cues on a graphical user interface (i.e., the spatial audio visualization interface 107). The spatial audio visualization interface 107 updates a display to render the visual spatial cues. The multi-sensory spatial audio experience system 100 controls communication of the decoded audio signal to the device 104 and communication of the visual spatial cues to the spatial audio visualization interface 107 to ensure coordinated rendering of the auditory-visual spatial cues. To ensure coordinated rendering of the auditory-visual spatial cues between the device 104 and the spatial audio visualization interface 107, the release of the decoded audio signals to the device 104 is coordinated with the release of the visual spatial cues to the spatial audio visualization interface 107. The device 104 and the spatial audio visualization interface 107 may be synchronized to delay audio release to the device 104 until the spatial audio visualizer 106 finishes generating visual spatial cues based on the auditory spatial cues. The device 104 and spatial audio visualizer 106 are coordinated using buffers, where each releases processed data at the expiration of a buffer time period. The device 104 and/or the spatial audio visualizer 106 may store audio spatial cues 103A and 103B until the entire buffer is full and then process the data. The data may also be processed upon receival and the processed data stored until the buffer is full.

The spatial audio visualization interface 107 visualizes spatial audio by displaying positions associated with spatial audio defined by the auditory spatial cues on a display screen 109. An indicator displayed on the display screen 109 may represent a virtual audio source which outputs the audio. The indicator indicates a position associated with the auditory spatial cue and a feature of the auditory spatial cue. In some examples, the display screen 109 may display many indicators placed along a circle whose center represents a listener. The indicators may also be any other shape. The indicators may also be dynamic shapes or bars that move according to the visual spatial cues. Each indicator marks a specific position associated with an auditory spatial cue with respect to the listener, similar to a map. For instance, when a listener 110 is facing north, an indicator 111A represents a position associated with a spatial audio which is northeast of the listener 110, an indicator 11B represents a position associated with a spatial audio which is northwest of the listener 110, and an indicator 111C represents a position associated with a spatial audio which is southwest of the listener 110. The indicators get a luminescent quality or shading from loudness of the auditory spatial cues, as determined by the visualization system 106. In some examples, shading of the indicators around the listener 110 depict the indicator level. For instance, the indicator 111A is depicted as white, while the indicator 111B is dark grey, and the indicator 111C is light grey. In this example, the indicator 111B represents the loudest spatial auditory cue while 111A is a quiet or silent spatial auditory cue, and 111C represents a volume of a spatial auditory cue in between volumes corresponding to the indicators 111A and 111B. The visualization on the spatial audio visualization interface 107 in some examples may be activated by a toggle 108 on the spatial audio visualization interface 107 that may be controlled by user input.

Figure 2:
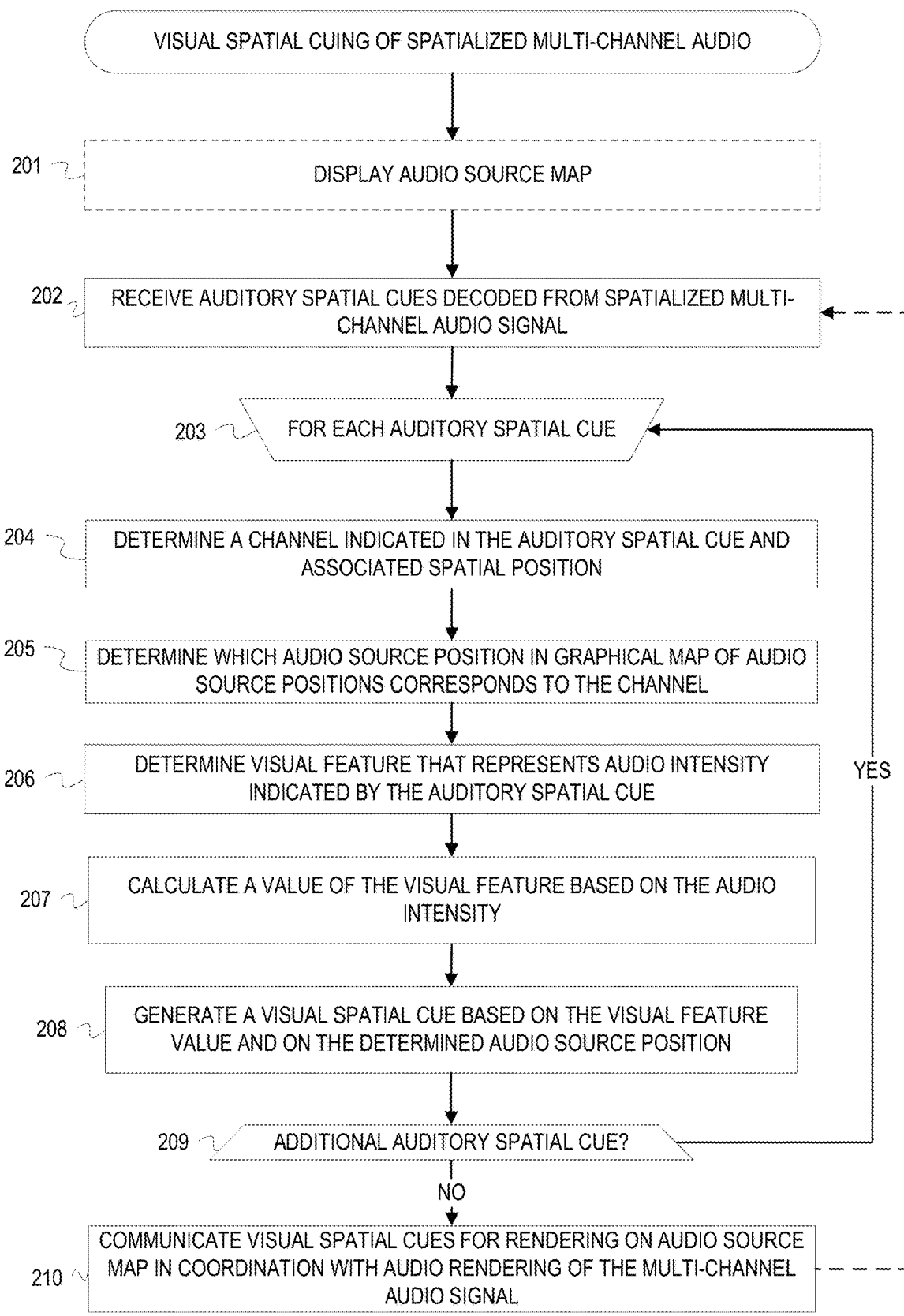
FIG. 2 depicts a flowchart of example operations for visual spatial cuing of spatialized multi-channel audio.
Figure 3:
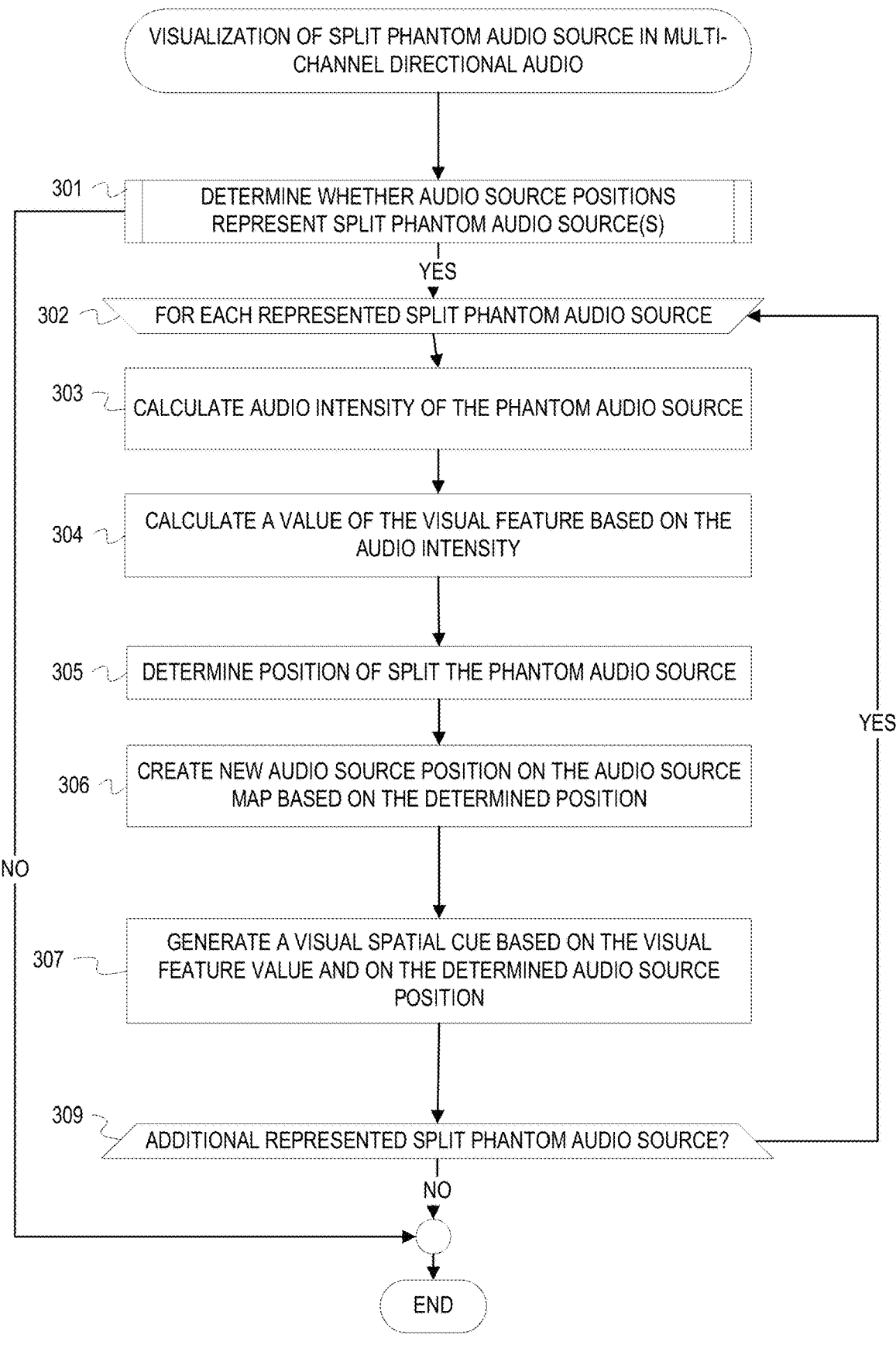
FIG. 3 depicts a flowchart of operations for spatialization of split phantom audio sources in multi-channel directional audio.
Figure 4:
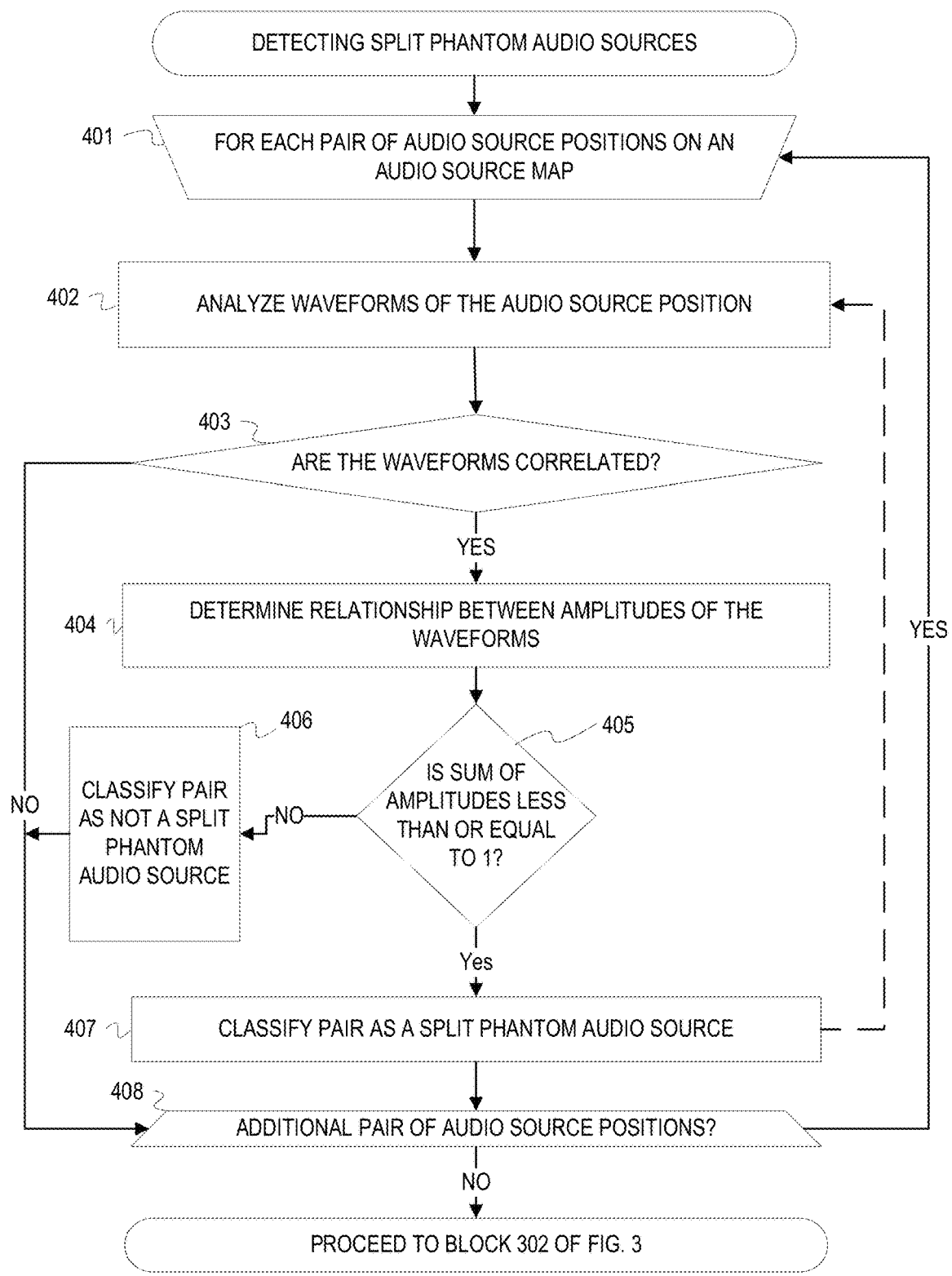
FIG. 4 depicts a flowchart of operations for detecting split phantom audio sources.

FIGS. 2, 3 and 4 depict flowcharts described as performed by a multi-sensory spatial audio experience system. The flowcharts are described with reference to the multi-sensory spatial audio experience system for consistency with FIG. 1. A multi-sensory spatial audio experience system can be implemented with hardware, software, or a combination thereof. The naming and organization of functionality into a single unit is for ease of description. Naming and organization of functionality, especially in program code, can widely vary based on programming language, platform, and even be arbitrary.

FIG. 2 depicts a flowchart of example operations for visual spatial cuing of spatialized multi-channel audio.

At block 201, a spatial audio visualizer displays an audio source map on an interface, such as the spatial audio visualization interface of FIG. 1. For multi-channel audio, the location of each channel is known and can be mapped to a location on one of a series of concentric circles prior to receiving any auditory spatial cues. The initial display of the audio source map may include an indicator representing a user or listener and concentric rings surrounding the listener. The spatial audio visualizer generates the concentric circles and positions indicators which represent the spatial audio sources on the circles. A radius of each circle represents the distance from the listener to the multi-channel audio source.

Block 201 is an optional operation. Instead of initially displaying the audio source map, the spatial audio visualizer may have the audio source map structure stored in a memory but not displayed or rendered yet. In this instance, the audio source map structure is readily available, but the audio source map is not displayed until an auditory spatial cue is received. In addition, the spatial audio visualizer may not itself present for display the audio source map but may provide or communicate the audio source map (and subsequent graphical updates) to a user interface engine or graphics driver that provides the graphical data for output on a display.

At block 202, the spatial audio visualizer receives auditory spatial cues decoded from multi-channel directional audio. The spatial audio visualizer may buffer auditory spatial cues from an audio decoder until a predefined amount has been received. Alternatively, the audio decoder may buffer auditory spatial cues and delay sending for visualization processing until the buffer reaches a predefined level.

At block 203, the spatial audio visualizer begins processing each received auditory spatial cue. In this flowchart, the processing includes the example operations represented by blocks 204, 205, 207, 209, and 211.

At block 204, the spatial audio visualizer determines a channel indicated in the auditory spatial cue and an associated spatial position. The spatial audio visualizer determines a spatial position associated with the auditory spatial cue. In multi-channel audio, the audio spatial cues may include multiple channels of audio data. Each channel defines a respective spatial audio and is associated with a speaker position. In examples, the speaker position associated with the channel is the spatial position associated with the auditory spatial cue.

At block 205, the spatial audio visualizer determines which audio source position in a graphical map of audio source positions corresponds to the channel. The spatial audio visualizer maps the determined audio source position to the position on a circle representing the known location of each channel. Using the displayed or stored audio source map of block 201, the spatial audio visualizer correlates the auditory spatial cue to one of the indicators representing the channels.

At block 206, the spatial audio visualizer determines a visual feature that represents audio intensity as indicated by the auditory spatial cue. The feature may be loudness or some other characteristic of the spatial audio defined by the channel.

At block 207, the spatial audio visualizer calculates a value of the visual feature based on the audio intensity. The spatial audio visualizer uses a trigger metric algorithm to calculate the value of the visual feature. Trigger metric algorithms may take different forms. Some trigger metric algorithms may be more suitable than others and may depend on available processing abilities of a computing device to execute the trigger metric algorithms, among other criteria. The trigger metric algorithms may be any time domain algorithm, frequency domain algorithm, or any domain that can be inferred from either or both frequency and time domains. The examples provided are for example only and possible trigger metric algorithms are not limited to the examples. Implementation of calculating the visual feature value based on audio intensity indicated in the auditory spatial cue can vary depending upon the information expressed in the auditory spatial cue.

Each auditory spatial cue includes an amplitude value of the audio. Each of the amplitude values may range between −1 and +1 or some other range. In one example, the spatial audio visualizer may calculate absolute values of the amplitude values. The spatial audio visualizer may then sum the absolute values and/or average the absolute values. The sum or average may be indicative of a loudness of the auditory spatial cue and the value of the visual feature. In another example, the spatial audio visualizer may square the amplitude values and then integrate the squared amplitude values. The integral may be indicative of the loudness of the auditory spatial cues and the value of the visual feature.

The auditory spatial cues may be composed of signals with different frequencies. In some examples, the visual feature may be calculated based on those signals in a range of frequencies. The signals and frequencies of signals may be determined by transforming the auditory spatial cues from a time domain into a frequency domain, such as by a Fourier transformation. The signals of the different frequencies may each have an amplitude value. The spatial audio visualizer may identify the amplitude values of the signals with a frequency in a range of frequencies. The range can be pre-defined based on known ranges associated with the spatial audio and delimited by a lower frequency and an upper frequency defining an interval over the audible frequency range. The lowest range may be 20-60 Hz, corresponding to a bass range, while the highest frequency range may be 6000-20,000 Hz. Other known spectrum values may be used, or the spatial audio visualizer may define the bands based on the signals of the different frequencies. Alternatively, the range of frequencies may include an average of the frequencies of the signals. The spatial audio visualizer may determine the value of the visual feature as described above based on the amplitude values of the signals in the range using the absolute value or integral calculation.

When an auditory spatial cue has multiple audio features, the spatial audio visualizer may determine a value of each visual feature. The spatial audio visualizer determines from the auditory spatial cue an additional audio feature and a value for the additional audio feature, as described above. The spatial audio visualizer calculates a value for each identified visual feature based on the additional audio features, as described above. These multiple visual feature values may be combined for subsequent calculations and analysis.

At block 208, the spatial audio visualizer generates a visual spatial cue based on the visual feature value and on the determined audio source position. The spatial audio visualizer maps the value of the selected feature to a corresponding indicator on one of the concentric circles. For example, the visual feature may be luminosity. The value of the visual feature may be mapped such that a value of 0 is mapped to a 0% brightness and a value of +1 is mapped to a 100% brightness. Values falling in between 0 and +1 may be proportionately mapped to a percentage of brightness.

Instead of, or in addition to, brightness, the spatial audio visualizer may generate the visual spatial cue in the form of a radius of the indicator. Similar to generating a visual spatial cue based on indicator brightness, the spatial audio visualizer defines a range of radii for indicators. For example, the mapping system may map a value of 0 to a radius of 0 centimeters and a value of +1 to a radius of 10 centimeters. Indicator values falling in between 0 and +1 may be proportionately mapped to a radius with the defined range of minimum and maximum radii.

In some examples, the auditory spatial cues may indicate various levels of elevation as part of the spatial position information. Elevation information is included in the spatial position information determined at block 204. In these instances, the indicators are mapped on a horizontal plane using one of the previously described mapping methods. In addition to the indicator level mapping, the spatial audio visualizer may indicate elevation of the multi-channel audio. For example, a horizontal plane relative to a listener's eye level may be assigned one color, above the listener's eye level may be defined as another color, and below the listener's eye level may be defined as yet another color. Based on the elevation indicated in the auditory cues, the spatial audio visualizer assigns each indicator a color and maps brightness or radius. The spatial audio visualizer may also use shading to indicate elevation. Instead of a system with colors, various shades between white and black may be used.

At block 209, the spatial audio visualizer determines if there are additional auditory spatial cues to process. If yes, operations return to block 203. If not, operations continue to block 210.

At block 210, the spatial audio visualizer communicates the visual spatial cues for rendering on an audio source map in coordination with audio rendering of the audio signal. The spatial audio visualizer provides the generated visual spatial cues for each auditory spatial cue to a display screen. Each indicator may be located on the display screen based on a spatial position associated with an auditory spatial cue and have a luminosity, color, and/or size.

Because the value of a visual feature of an auditory spatial cue may change over time as auditory spatial cues cease or as additional auditory spatial cues are received, the spatial audio visualizer may receive additional auditory spatial cues after the operations of block 210. To create an immersive auditory environment, active channels are displayed on the audio source map while inactive channels fade or are not displayed. When the magnitude of a calculated visual feature is within a threshold range, the audio source map displays the visual feature. The threshold may be a predefined range of values or the threshold may be set based on the received audio. For example, the threshold may be set to display any visual features greater than zero. The threshold may also be set to a non-zero minimum based on values capable of being detected by the human ear (i.e. decibels, frequencies, etc.). When the auditory spatial cues are outside the threshold range, the auditory spatial cue is not displayed on the audio source map. When additional auditory spatial cues are received for at least one channel, operations return to block 202. The operations may be repeated for each channel or only for the channel for which the additional auditory spatial cues were received. The additional auditory spatial cues may be used to update the values of the visual features associated with an indicator which is reflected as a brightness or radius change in an associated indicator on the display screen. The frequency by which the value of the visual feature is updated may depend on a buffer length of the buffer which receives the auditory spatial cues at block 202. The frequency may be proportional to (1/(buffer length)). For example, a buffer which receives 512 samples in 0.5 seconds results in a frequency of refreshing the value of the selected feature twice a second. As the buffer length increases, the refresh is less often and vice versa. The buffer length may be chosen to define a latency associated with updating the value of the selected feature. Position of the indicator may not change, unless a speaker is moved because the position associated with a spatial audio is a speaker position which is typically stationary.

The flowchart of FIG. 2 assumes a fixed number of audio source locations based on the number of channels in the multi-channel audio. Each audio source is mapped directly to one of the fixed locations on the display. However, in some instances, not all audio sources map directly to one of the fixed locations. A content engine of the spatial audio visualizer corrects for this by splitting the audio source across nearby audio source locations. When a direction of the audio source is between a pair of the fixed audio source locations, the content engine utilizes a panning technique to render the audio source in which the audio source is split between the points that surround it. While the audio source is typically split between two fixed positions, the audio source may be split into more than two fixed positions. For example, in a 5.1 multi-channel audio setting, fixed positions may be at (0,0), (30,0), and (90,0). To render an audio source at (45,0), the content engine pans the audio source to distribute the audio source energy between available points on the grid. This simulates a phantom or split audio source at (45,0). The process of splitting audio sources to map to a fixed position can be reversed to estimate the true location of the audio source. FIG. 3 provides an example of operations for spatializing split audio sources and the spatial cues associated with the split audio sources.

FIG. 3 depicts a flowchart of operations for visualization of split phantom audio source in multi-channel directional audio. Operations of FIG. 3 may be performed concurrently with operations of FIG. 2. Operations of FIG. 3 may also be performed after completion of operations of the flowchart of FIG. 2. While operations of FIG. 3 are described with reference to a pair of audio source positions, any number of source positions of the fixed source positions may be used. Operations of the flowchart of FIG. 3 begin at block 301 after determination of spatial positions from audio spatialization cues, examples of which are depicted in FIG. 2. This example flowchart for visualization of a split phantom audio source position assumes an output is available after the example operation represented by block 210 of FIG. 2.

At block 301, the spatial audio visualizer determines whether audio source positions represent a split phantom audio source(s). The spatial audio visualizer examines information corresponding to the audio source positions that have been determined from the audio spatial cues, for example at block 204, to determine correlations among the audio source positions that likely correspond to splitting. The spatial audio visualizer can examine visual feature values and/or waveforms from the waveforms corresponding to the audio source positions to determine correlations that suggest a split phantom audio source. Operations for detecting split phantom audio sources are described in greater detail in FIG. 4. If it is determined that a split phantom audio source is represented, then control flows to block 302 to iterate over each represented split phantom audio source. Otherwise flow for FIG. 3 ends and, for instance, continues to block 210 of FIG. 2.

At block 302, the spatial audio visualizer selects a first split phantom audio source to visualize. The spatial audio visualizer may select the order for visualizing split phantom audio sources based on the order in which the audio sources were received, a visual pattern on the audio source map (i.e., clockwise on a circular audio source map), or another predefined selection criteria.

At block 303, the spatial audio visualizer calculates an audio intensity of the phantom audio source. A pair of audio source positions represent the split phantom audio source. The audio intensity of the phantom audio source is usually the sum of the intensities of the pair of audio source positions of the split phantom audio source. The spatial audio visualizer extracts the audio intensity for each audio source location from the auditory spatial cues, as described in FIG. 1. As an example, the intensities for each of these points may be summed to provide the total audio intensity for the phantom audio source. A phantom audio source, Point X, is determined to be split between Point A and Point B. The intensity of Point A is 0.5, and the intensity of Point B is 0.3. The audio intensity of Point X would then be 0.8.

Additionally, calculating an audio intensity of the phantom source may include correcting the audio intensities of the pair of audio source positions. The spatial audio visualizer may filter the phantom split phantom audio intensities from each of the audio intensities of the audio source positions. This may be a subtraction of the split phantom audio intensity from the total audio intensity. The spatial audio visualizer may redo operations 207 and 208 of FIG. 2 on the corrected audio intensities for rendering, or the spatial audio visualizer may track and store the corrections for rendering at a later time.

At block 304, the spatial audio visualizer calculates a value of a visual feature of the phantom audio source based on the audio intensity, similar to block 206 of FIG. 2.

At block 305, the spatial audio visualizer determines the position of the phantom audio source. The position of the phantom audio source is determined based on the audio intensities of the split phantom audio source, as determined in block 303, as well as the audio intensities and positions of each of the fixed positions representing the split phantom audio source. An example of an equation for calculating the position of the split phantom audio source is represented by Equation 1:

$$\text{Position}_X = \text{Position}_B - (\text{Intensity}_A / \text{Intensity}_X) \times (\text{Position}_B - \text{Position}_A) \quad (1)$$

where X represents the split phantom audio source, A represents a first of the pair of fixed audio source positions, and B represents a second of the pair of fixed audio source positions. For the example in block 304 with the positions of Point A at 30° and Point B at 90°, the position of Point X, determined using Equation 1 is 52.5°. The assignment of Point A or Point B to each of the neighboring points is inconsequential as the final value is relative to the selection of points, and it is the magnitude of the position value that contains the information. In this example, the position of Point X is calculated with respect to Point B. The position may also be calculated with respect to Point A by switching the order of Point B with A and vice-versa. Equation 1 is provided as one method for calculating the position of the phantom audio source.

Other panning equations may also be used to obtain the position of a split phantom audio source. Another example of a suitable panning equation for determining the position of a split phantom audio source uses Blumleins stereophonic law of panning using sines, as represented by Equation 2:

$$\text{Position}_X = \sin^{-1}\left(\frac{\sin(\text{Intensity}_A - \text{Intensity}_B)}{\sin(\text{Intensity}_A + \text{Intensity}_B)}\right) \quad (2)$$

where Position$_x$ is the location of Point X in degrees. Equation 1 and Equation 2, as well as other suitable panning equations, may be used interchangeably to determine the position of a split phantom audio source.

At block 306, the spatial audio visualizer creates a new audio source position on the audio source map based on the determined position of the phantom audio source. Similar to block 201 of FIG. 2, the spatial audio visualizer maps the position of the phantom audio source to a position on the audio source map. This position may be displayed as a source position or may be stored to display at a later time.

At block 307, the spatial audio visualizer generates a visual spatial cue based on the visual feature value and on the determined audio source position, similar to block 208 of FIG. 2.

At block 309, the spatial audio visualizer determines if there are additional represented split phantom audio sources. If there are, operations return to block 302. If there are no additional represented split phantom audio sources, operations end.

While FIG. 3 is described with reference to pairs in a two-dimensional plane (i.e., locations (X,Y)), operations of FIG. 3 may also be applied to three-dimensional space. The spatial audio visualizer may apply triangulation techniques to determine the position of the phantom audio source cue in three-dimensions. An example for triangulation in three-dimensions includes inversion using vector-based amplitude panning.

FIG. 4 depicts a flowchart of operations for detecting split phantom audio sources. Operations of FIG. 4 may be performed concurrently with operations of FIG. 3. Specifically, Operations of FIG. 4 may be performed in conjunction with block 301 or FIG. 3 Operations of FIG. 4 begin at block 401.

At block 401, the spatial audio visualizer selects a pair of audio source positions on an audio source map. Typically, phantom audio sources are split between two nearby pairs. However, the phantom audio source can be split between any number of audio source positions. The phantom audio source may also be split between non-adjacent audio source positions on the audio source map.

At block 402, the spatial audio visualizer analyzes waveforms of a pair of audio source positions to detect a split phantom audio source. The spatial audio visualizer analyzes the waveforms of a pair of the audio source positions to determine if there is a correlation between the two waveforms. As spatial audio cues of different channels are typically independent of each other, high correlations between the waveforms indicate a split phantom audio source is likely.

At block 403, the spatial audio visualizer determines if the waveforms are correlated. If the waveforms of the pair of audio source positions are correlated, operations continue to block 404. If not, operations proceed to block 408.

At block 404, the spatial audio visualizer determines the relationship between the amplitudes of the waveforms. A normalized amplitude of the waveform of each audio source position may be used to detect a split phantom audio source. Normalizing the waveforms accounts for the scale and offset of the waveforms to transform the waveform data from each audio source location into starting locations, amplitudes, and timescales that can be compared. In a normalized waveform, the maximum amplitude is positive one (+1) and the minimum amplitude is negative one (−1). Thus, the magnitude of the amplitude in either direction is one. The spatial audio visualizer sums the normalized waveforms for each of the audio source positions to determine the relationship between the amplitudes of the waveforms.

At block 405, the spatial audio visualizer determines if the sum of the amplitudes is less than or equal to one. If so, operations continue to block 407. If not, operations proceed to block 406.

At block 406, the spatial audio visualizer classifies the pair of audio source positions as not representing a split phantom audio source. Due to the nature of normalized waveforms, if the sum of the amplitudes is greater than one, the pair is not likely to represent a split phantom audio source.

At block 407, the spatial audio visualizer classifies the pair of audio source positions as a split phantom pair. If the amplitude of a waveform of an audio source position is less than one, it is likely that the audio source position represents a split phantom audio source. When a pair of audio source positions sums to one, the pair represents the locations to which the spatial cue was split. If the pair sums to less than one, the pair represents a split phantom audio source. However, the spatial cue may be split between more than two positions. If the sum of the amplitudes is less than one, operations may return to block 402 and operations may be repeated with an additional audio source location added to the pair.

At block 408, the spatial audio visualizer determines if there are additional pairs of audio source positions to analyze. If there are, operations return to block 401. If not, operations of the flowchart of FIG. 4 end, and operations proceed to block 302 of FIG. 3.

Figure 5:
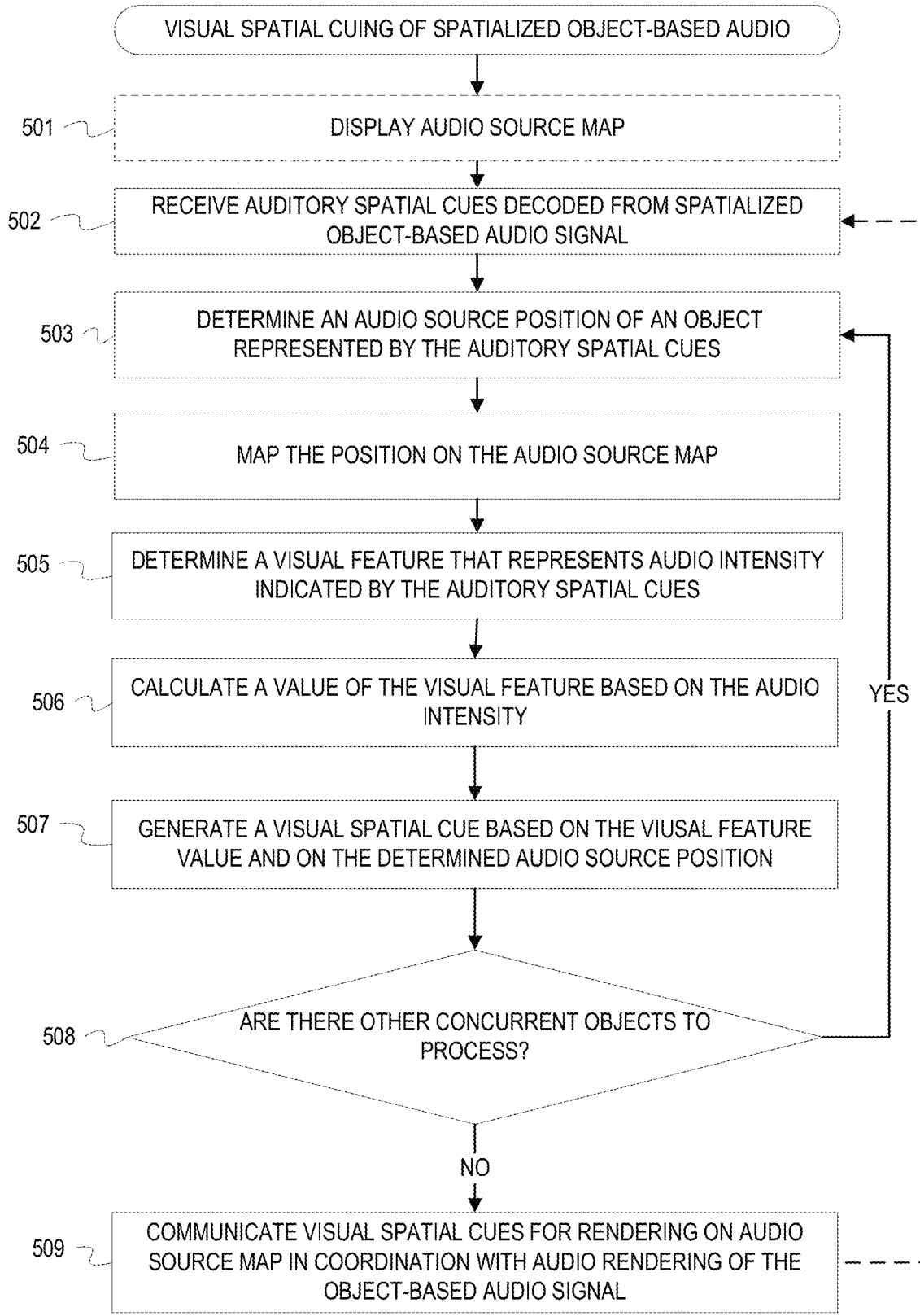
FIG. 5 depicts a flowchart of operations performed by the multi-sensory spatial audio experience for visualizing object-based audio.

FIG. 5 depicts a flowchart of example operations for visual spatial cuing of spatialized object-based audio. Operations of the flowchart of FIG. 5 begin at block 501.

At block 501, a spatial audio visualizer displays an audio source map displays an audio source map on a user interface. Block 501 is similar to block 201, however, because object-based audio does not have a predefined location associated with each object, the audio source map does not include position indicators prior to receiving auditory cues. Similar to block 201, block 501 is optional as the source map information may be stored and displayed at a later time.

At block 502, a spatial audio visualizer receives auditory spatial cues decoded from spatialized object-based audio signals. In examples, the auditory spatial cues are received from a digital audio system or device and stored in a buffer of a set length. The auditory spatial cues which include a number of audio samples may be received until the buffer is filled with a predefined amount of audio data. Each audio object is associated with metadata that defines features of the object, such as position, trajectory of movement, loudness or frequency of the audio object. The decoded auditory spatial cues include individual assets or features of the object-based audio along with the metadata describing the relationships and associations between one or more of the features and the object.

At block 503, the spatial audio visualizer determines an audio source position of an object represented by the auditory spatial cues. The spatial audio visualizer extracts the metadata from the auditory spatial cues to obtain information pertaining to the spatial position, trajectory, loudness and/or frequency of the object-based audio. The audio source position is a spatial position of an object defined in the metadata of the auditory spatial cue for that object. The object metadata defines an object with a position and a spatial audio associated with the object. The object may represent a virtual audio source located at the spatial position and which outputs the auditory spatial cue. The spatial audio visualizer extracts the spatial position metadata of the object from the object metadata. The spatial position metadata includes information on one or more of the distance, azimuth, or elevation relative to a listener.

At block 504, the spatial audio visualizer maps the position on the audio source map. For example, the spatial audio visualizer generates a circle and positions an indicator which represents the source location of the auditory spatial cue on the circle. A radius of the circle represents the distance from the listener to the spatial position. The spatial audio visualizer then uses an azimuth from the auditory spatial cues to further determine where to position the indicator on a circumference of the circle.

At block 505, the spatial audio visualizer determines a visual feature that represents audio intensity indicated by the auditory spatial cues. Processing of block 505 is similar to processing of block 206 of FIG. 2.

At block 506, the spatial audio visualizer calculates a value of the visual feature based on the audio intensity. Similar to block 207 of FIG. 2, block 502 uses a trigger metric algorithm. An example of a trigger metric algorithm suitable for object-based audio include any of the previously disclosed trigger metrics.

At block 507, the spatial audio visualizer generates a visual spatial cue based on the visual feature value and on the determined audio source position, similar to block 208 of FIG. 2.

At block 508, the spatial audio visualizer determines if there are other concurrent objects to process based on the audio data. Because multiple objects may be generating auditory spatial cues concurrently, the spatial audio visualizer determines if there are any other objects emitting sound concurrently with the processed auditory spatial cues. If there are other objects emitting concurrent auditory spatial cues, operations return to block 502. If the system determines there are no more objects to process, operation proceed to block 509.

At block 509, the spatial audio visualizer communicates the visual spatial cues for rendering on the audio source map in coordination with audio rendering of the object-based audio. The spatial audio visualizer provides the positions associated with the spatial audio determined at block 504 and respective values of the visual features determined at block 506 to the display screen. The display screen may display an indicator associated with the object. Each indicator may be positioned on the display screen based on a spatial position associated with an auditory spatial cue and have a luminosity, color, or size based on a value of a visual feature associated with the object-based audio. The indicators may be placed along a circle, where the center of the circle represents a listener.

Because objects move in the time domain and a value of a visual feature associated with an auditory spatial cue may change in the time domain, processing may return back to block 502. Receiving additional auditory spatial cues may indicate a change in position of an object or a change in a value of a visual feature. The change in position of an object may be associated with a change in spatial position associated with a spatial audio which is reflected by a change in position of an indicator associated with a spatial audio on the display screen. A change in a value of a visual feature associated with an auditory spatial cue may be reflected by a radius, color, and/or brightness change of the indicator on the display screen and may be refreshed at a rate based on the buffer size which receives the audio data at block 502.

Figure 6B:
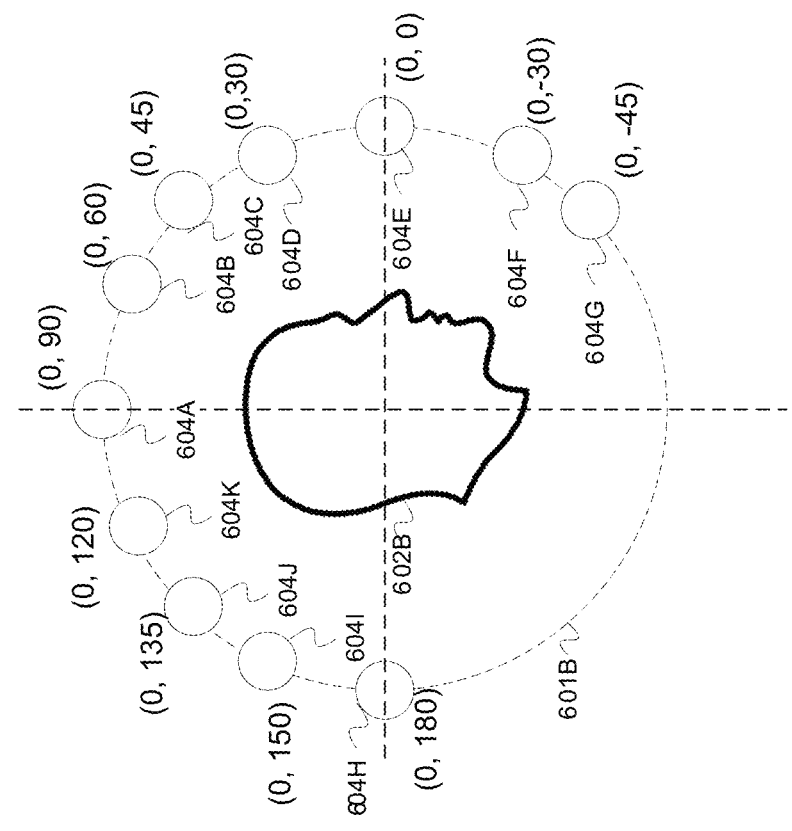
FIG. 6B depicts an example of spatial audio visualized in the sagittal plane.
Figure 6A:
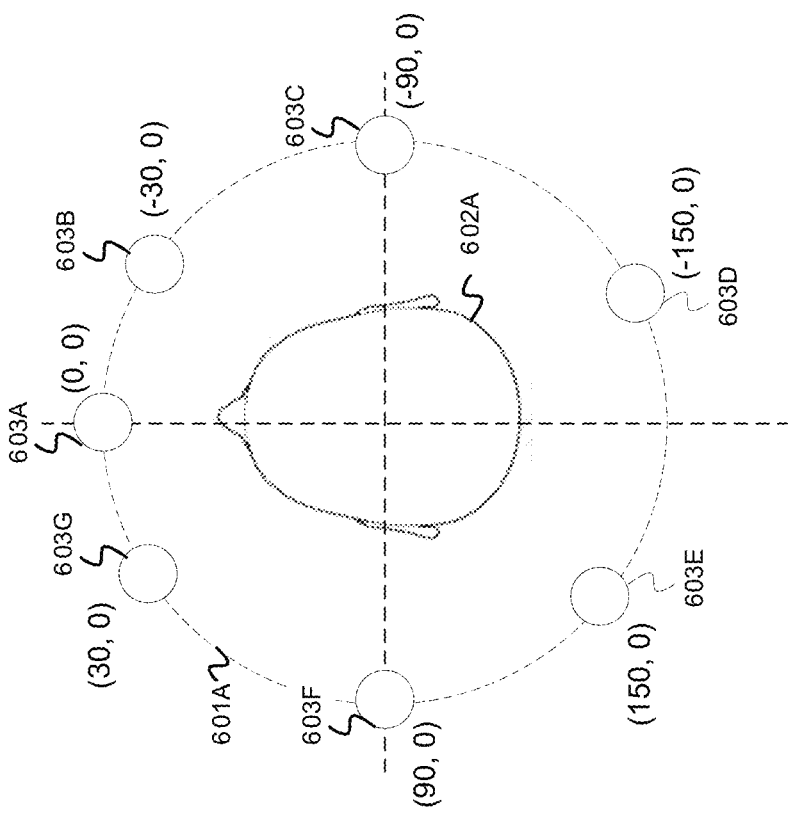
FIG. 6A depicts an example of spatial audio visualized in the azimuthal plane.

FIG. 6A depicts an example of spatial audio visualized in the azimuthal plane. A circle 601A represents an azimuthal plane around a listener 602A. A number of indicators 603A-G are spaced around the circumference of the circle 601A. The indicators 603A-G may represent the location of a physical audio source or speaker in relation to the listener 602A. When audio is visualized in the azimuthal plane, the elevation of each indicator 603A-G is the same while the azimuth varies for each speaker. In FIG. 6A, an azimuthal angle of 0 is defined in front of the listener 602A in the direction the listener 602A is facing. Indicator 603A, positioned directly in front of the listener 602A, has a coordinate (0, 0) where the coordinates indicate (azimuth, elevation) of an indicator. Each subsequent indicator has an azimuthal angle relative to the indicator 603A. Indicators to the left of the indicator 603A are assigned positive azimuthal angles while indicators to the right of the listener are assigned negative azimuthal angles. Indicators 603E-G have positive azimuthal angles of 150, 90, and 30, respectively. Indicators 603B-D have negative azimuthal angles of −30, −90, and −150.

FIG. 6B depicts an example of spatial audio visualized in the sagittal plane. A circle 601B represents the sagittal plane surrounding a listener 602B. In FIG. 6B, the circle 601B divides the listener 602B through a longitudinal line that anatomically splits the head into equal left and right sides. In this example, indicators 604A-K are positioned around the circle 601B in the sagittal plane. The indicators 604A-K are aligned in the azimuthal plane. Similar to FIG. 6A, a starting reference point of (0, 0), corresponding to indicator 604E, is defined in front of the listener 602B. Indicators 604F and 604G are positioned below the starting point and are defined by negative sagittal angles. The remaining indicators 604D-H fall above the listener 602B. Indicator 604A defines a position directly above the listener's head at a sagittal angle of 90. Angles less than 90 indicate a speaker falls in front of the listener 602B while angles greater than 90 indicate a speaker is positioned behind the listener.

While FIGS. 6A-B depict a set number of indicators, any number of indicators may be used. The indicators may also be at different angles in either the azimuthal or sagittal planes. The (0, 0) reference point is defined for example illustration only. The (0, 0) reference point may be defined in a manner most convenient or suitable for any given situation.

Figure 7:
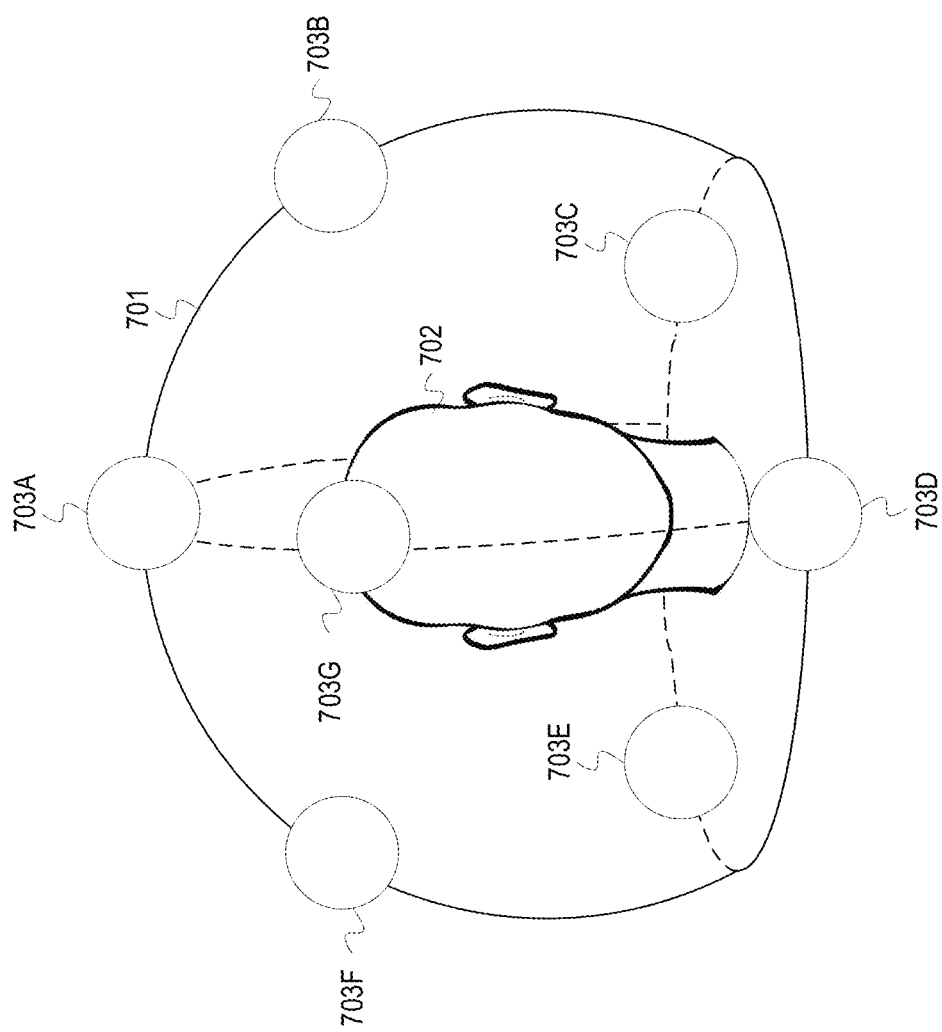
FIG. 7 depicts an example of spatial audio visualized in three dimensions.

FIG. 7 depicts an example of a spatial audio visualized in three dimensions. Similar to FIGS. 6A-B, FIG. 7 depicts a listener 702 surrounded by indicators 703A-G. However, instead of restricting indicators to a single plane, the indicators 703A-G are positioned on a sphere 701. The indicators 703A-G are positioned in front, behind, left, right, and above the listener 702. The sphere 701 combines multiple options of azimuthal and sagittal planes to provide a greater range of immersive audio and speaker positions.

Figure 8B:
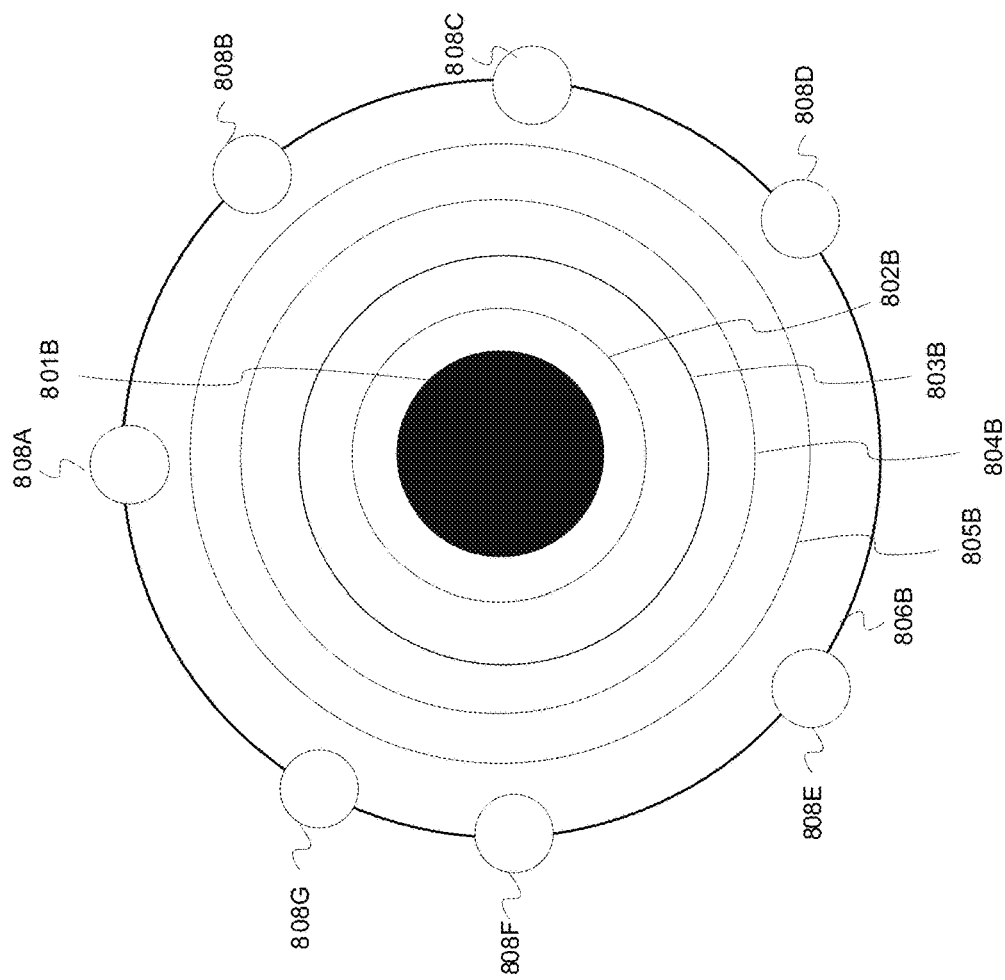
FIG. 8B depicts an example of spatial audio visualized with audio occurring far from the listener.
Figure 8A:
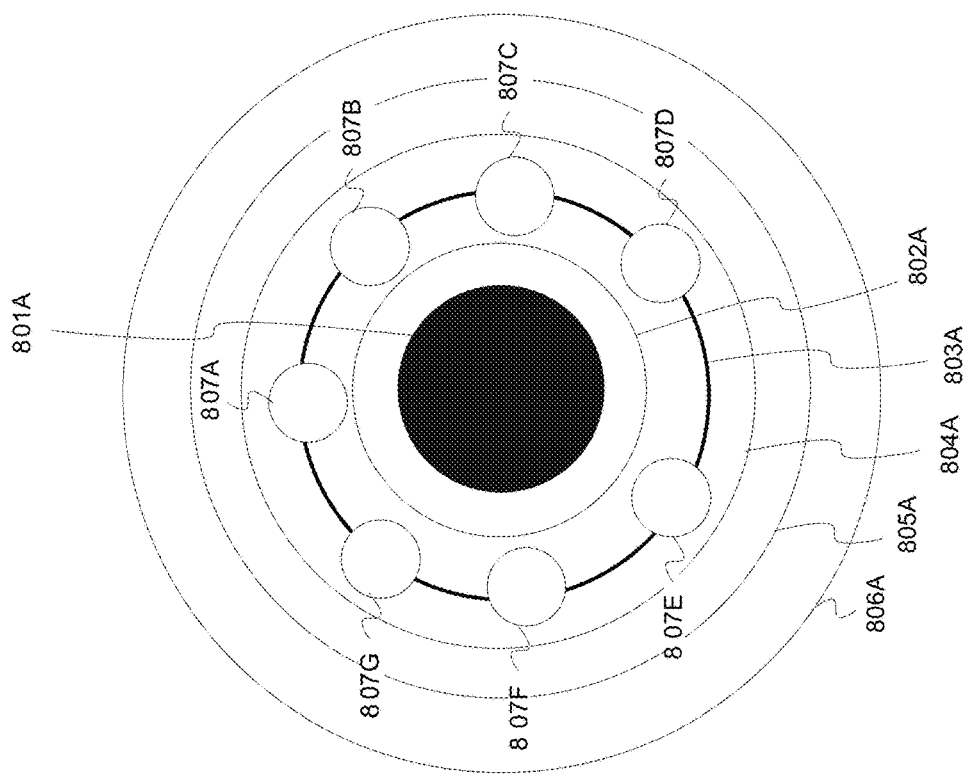
FIG. 8A depicts an example of spatial audio visualized with audio occurring close to a listener.

FIG. 8A depicts an example of spatial audio visualized with audio occurring close to a listener. As an example, spatial audio is depicted using a series of concentric rings 801A-806A. The innermost ring 801A represents a listener. The innermost ring 801A may also indicate low frequency effects in the auditory spatial cues. Low frequency effects, such as bass, do not have a set position associated with the auditory spatial cues. Each ring increases distance from the listener. For example, the spacing between each ring may represent one meter. In this example, ring 802A is one meter from the listener at ring 801A while ring 806A is five meters from the listener at ring 801A. Indicators 807A-G represent the position of speakers with respect to the listener. For equidistant speakers surrounding a listener, all indicators are positioned on one of the rings. FIG. 8A depicts the indicators 807A-G along ring 803A.

FIG. 8B depicts an example of spatial audio visualized with audio occurring far from the listener. Similar to FIG. 8A, FIG. 8B depicts a series of concentric rings 801B-806B where ring 801B represents the location of a listener. Indicators 808A-808G represent the locations of speakers or audio sources surrounding the listener. IN FIG. 8B, the indicators 808A-G are positioned on ring 806B. Compared to FIG. 8A, the indicators of FIG. 8B are a greater distance from the listener, indicating the speakers are further away.

Figure 9:
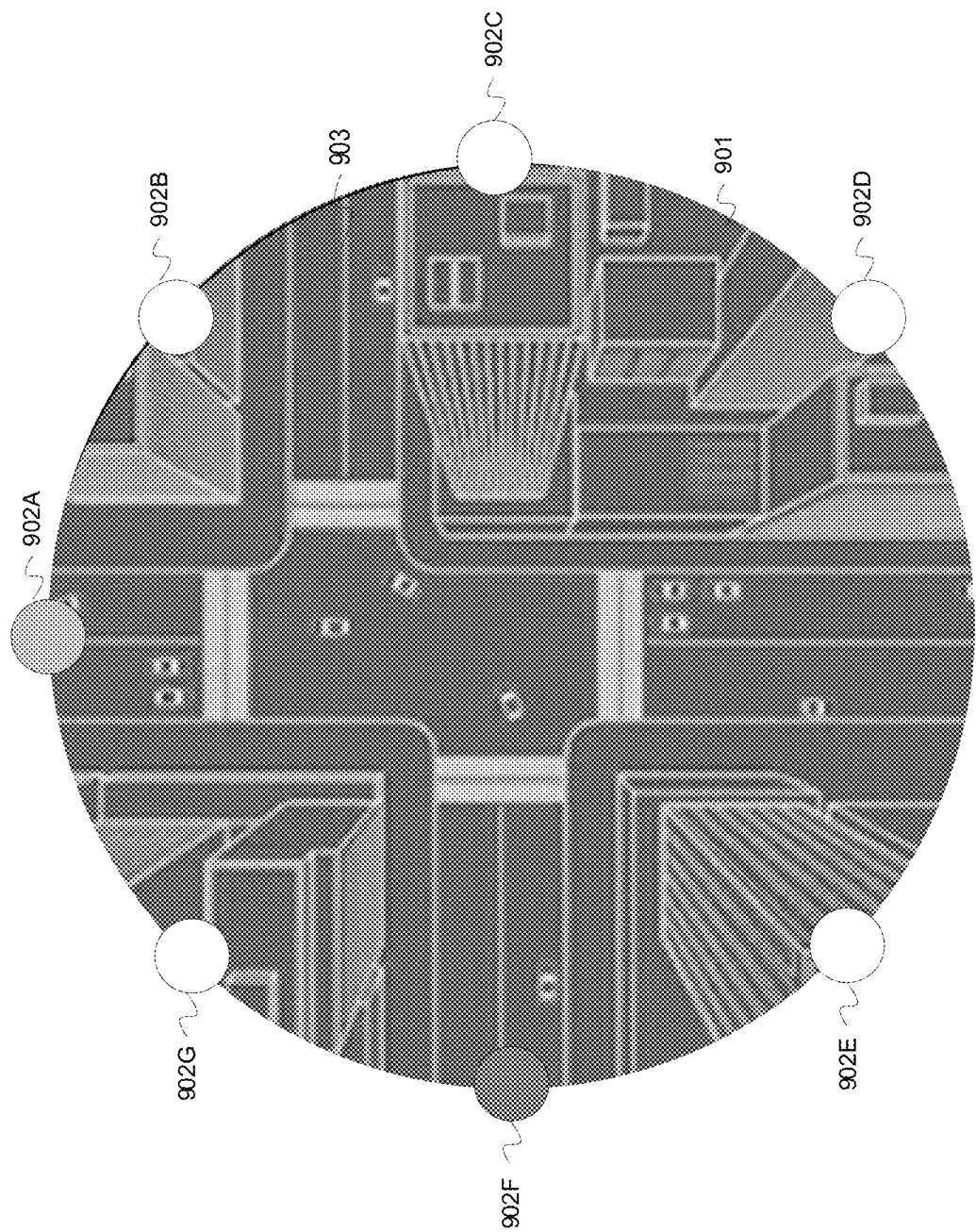
FIG. 9 depicts an example of a virtual environment with spatial audio visualization.

FIG. 9 depicts an example of a virtual environment with spatial audio visualization. While FIGS. 8A and 8B depict spatial audio visualized in a stand-alone application, the concept can also be incorporated inside another application. This can be done by incorporating spatial audio visualization into the application. This can also be done by overlaying existing spatial visualization elements with an audio visualization system. FIG. 9 depicts an example of a map with an audio visualization overlay. FIG. 9 depicts a combination of spatial audio visualization and a virtual environment. A ring 901 surrounds a portion of a map 903. The ring 901 indicates the distance of speakers relative to the center of the map 903. Indicators 902A-G indicate the position of speakers around a listener and the location of virtual audio in the virtual reality environment. Shading or illumination is used to indicate the occurrence and loudness of audio in the virtual reality environment. White indicators depict a silent speaker while shaded speakers indicate an active speaker. Darker shading indicates a louder volume from a specific audio source. In the example in FIG. 9, indicators 902A and 902F are shaded while indicators 902B-E and 902G are white. In this example audio is only occurring at the location of indicators 902A and 902F. Since 902F is shaded darker than 902A, audio is occurring at a louder volume at the location of indicator 902F than it is at the location of indicator 902A.

Figure 10:
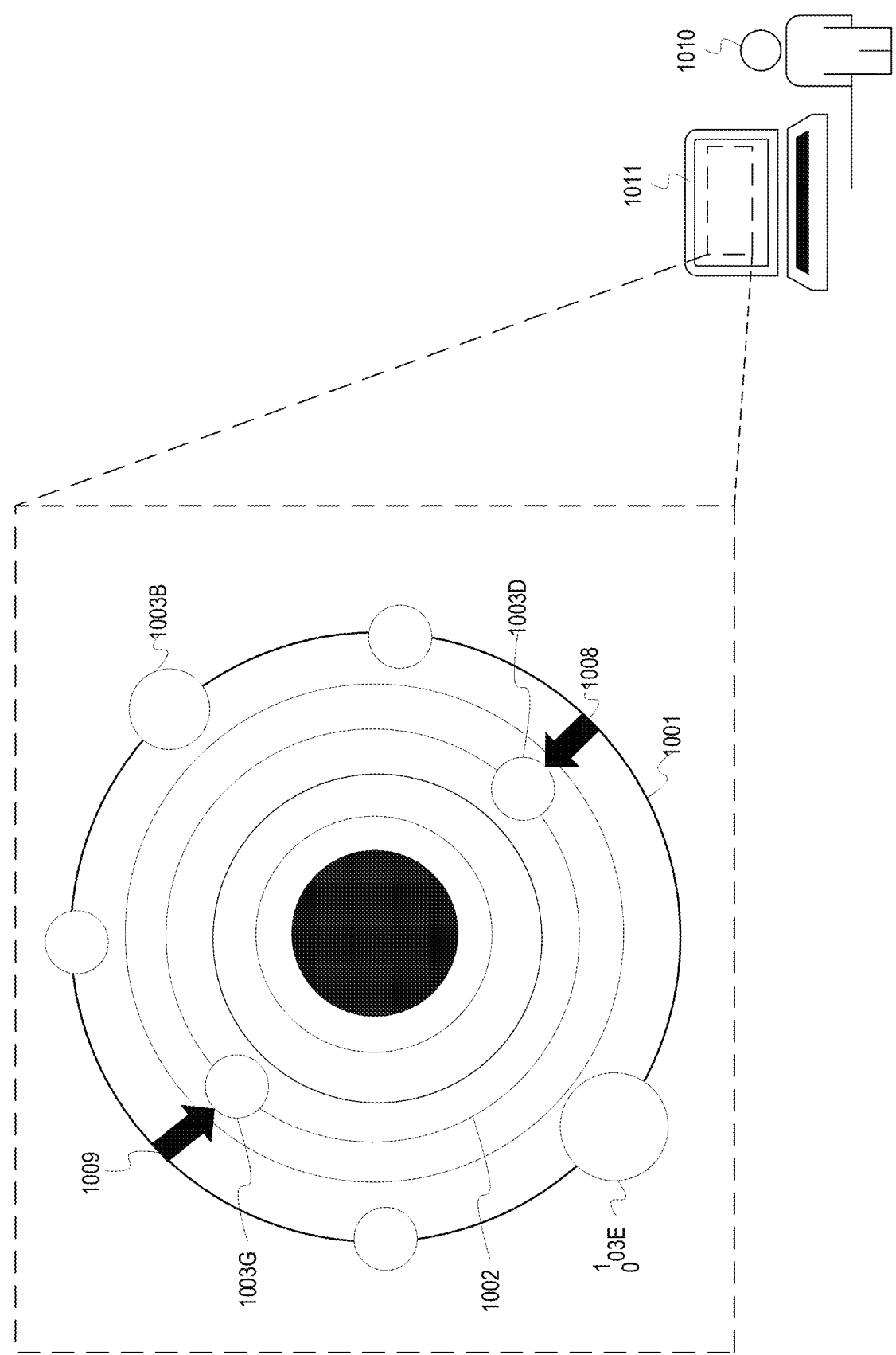
FIG. 10 depicts an example of the listener controlling spatial audio visualization.

FIG. 10 depicts an example of the listener controlling spatial audio visualization. In previous examples, the location of the speakers, and thus the location of the indicators, were in fixed locations equally spaced along a concentric ring. However, in other instances, speaker position may be controlled and set by a user. To account for this, a user can adjust the settings in the multi-sensory audio experience system to match a custom speaker set up. A user 1010 controls the display options on a display screen 1011 to customize the display settings to match the physical speaker arrangement. Arrows 1008 and 1009 indicate movement of indicators 1003D and 1003G from an outer concentric ring to an inner concentric ring 1002. Additionally, FIG. 10 depicts an alternate example of depicting audio volume. Instead of shading indicators to represent volume, a diameter of an indicator may also indicate volume. For example, indicators 1003B and 1003E have greater diameter than the rest of the indicators in FIG. 10 indicating the volume of audio coming from the locations of these indicators is greater than volume from any other location.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 11:
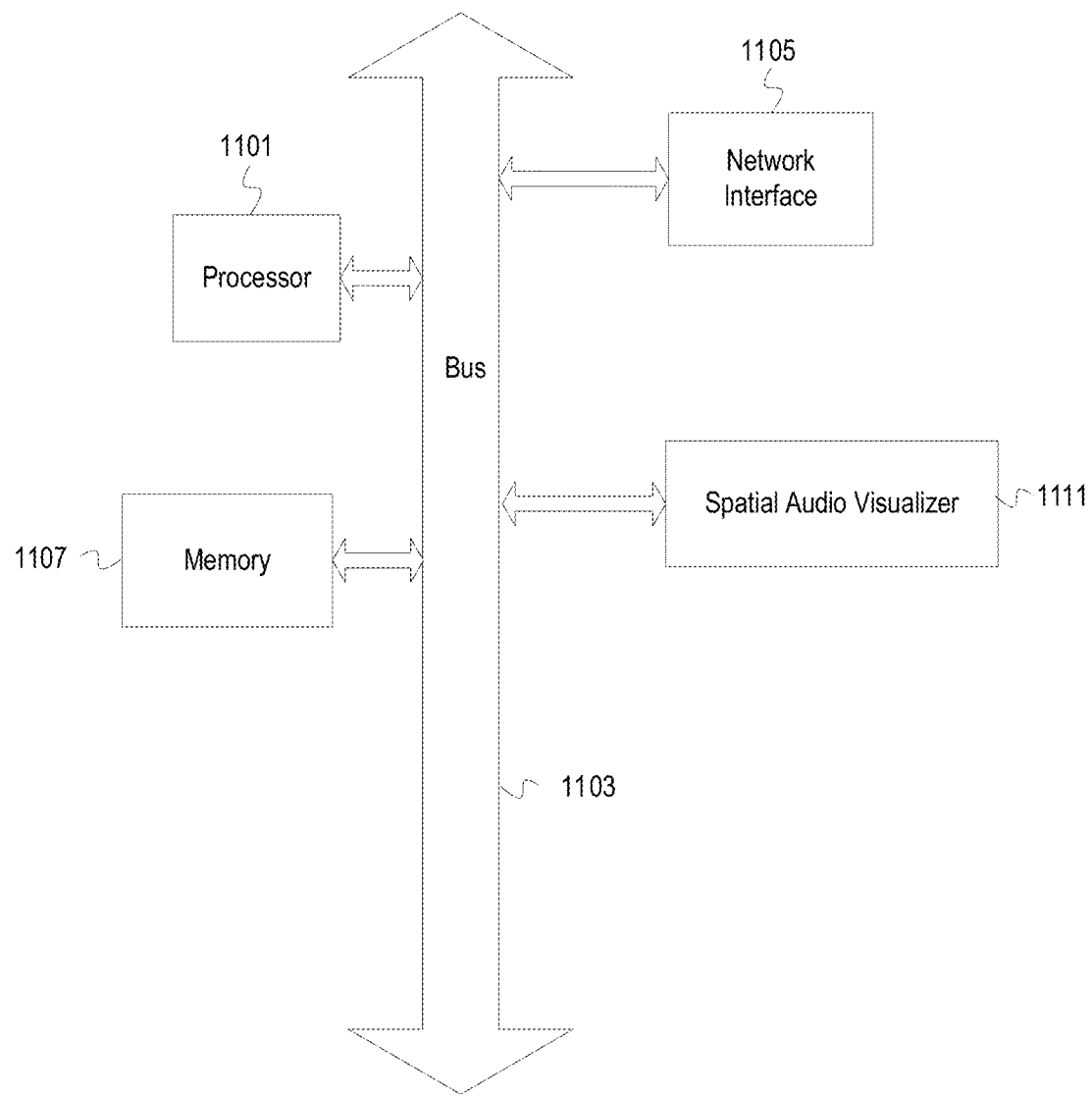
FIG. 11 depicts an example computer system associated with visualizing spatial audio.

FIG. 11 depicts an example computer system associated with visualizing spatial audio. The computer system includes a processor 1101 (possibly including multiple processors, multiple cores, multiple nodes, and/or implementing multi-threading, etc.). The computer system includes memory 1107. The memory 1107 may be system memory or any one or more of the above already described possible realizations of machine-readable media. The computer system also includes a bus 1103 and a network interface 1105. The system also includes a spatial audio visualizer 1111. Any one of the previously described functionalities may be partially (or entirely) implemented in hardware and/or on the processor 1101. For example, the functionality may be implemented with an application specific integrated circuit, in logic implemented in the processor 1101, in a co-processor on a peripheral device or card, etc. Further, realizations may include fewer or additional components not illustrated in FIG. 11 (e.g., video cards, audio cards, additional network interfaces, peripheral devices, etc.). The processor unit 1101 and the network interface 1105 are coupled to the bus 1103. Although illustrated as being coupled to the bus 1103, the memory 1107 may be coupled to the processor 1101.

While the aspects of the disclosure are described with reference to various implementations and exploitations, it will be understood that these aspects are illustrative and that the scope of the claims is not limited to them. In general, techniques for spatial audio visualization as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
for a first auditory spatial cue decoded from a spatialized audio signal,
determining which of a plurality of positions indicated in a map of audio source positions corresponds to the first auditory spatial cue;
calculating a value of a first visual feature based on an audio intensity value indicated in the first auditory spatial cue;
generating a first visual spatial cue based on the calculated value for the first visual feature and the position of the plurality of positions determined as corresponding to the first auditory spatial cue;
communicating the first visual spatial cue for rendering the first visual spatial cue around a listener displayed in a graphical user interface in coordination with rendering of the first auditory spatial cue and corresponding audio with an audio output device of the listener; and
synchronizing communicating of the first visual spatial cue for rendering with communicating the first auditory spatial cue for rendering, wherein the communicating of the first visual spatial cue for rendering and the communicating the first auditory spatial cue for rendering are synchronized using buffering;
wherein the spatialized audio signal comprises object-based audio and determining which of the plurality of positions indicated in the map of audio source positions corresponds to the first auditory spatial cue comprises determining spatial information from metadata decoded from the spatialized audio signal and determining the corresponding position based on the metadata indicated in the first auditory spatial cue.

2. The method of claim 1, further comprising rendering a graphical representation of the map of audio source positions, wherein the graphical representation comprises dots, lines, arcs, or other two-dimensional or three-dimensional representations.

3. The method of claim 2, wherein communicating the first visual spatial cue for rendering in the graphical user interface comprises causing the graphical user interface to update the graphical representation of the map of audio source positions based, at least in part, on the first visual spatial cue.

4. The method of claim 1, wherein the spatialized audio signal comprises multi-channel audio and determining which of the plurality of positions indicated in the map of audio source positions corresponds to the first auditory spatial cue comprises determining a channel indicated in the first auditory spatial cue and which of the plurality of positions corresponds to the channel.

5. The method of claim 1, wherein calculating the value of the first visual feature comprises calculating, based on the first auditory spatial cue, an absolute value of an amplitude of the spatialized audio signal, an integral of a squared absolute value of the amplitude of the spatialized audio signal, a frequency band of the spatialized audio signal, or a location-based energy of the spatialized audio signal.

6. The method of claim 1, further comprising determining the first visual feature, wherein the first visual feature comprises at least one of a luminosity, a brightness, a color, or a size corresponding to audio intensity.

7. The method of claim 6, further comprising determining a second visual feature as also corresponding to audio intensity and calculating a value for the second visual feature based on the audio intensity value.

8. The method of claim 6, further comprising:
determining from the first auditory spatial cue an additional audio feature and value for the additional audio feature;
identifying a second visual feature as corresponding to the additional audio feature; and
calculating a value for the second visual feature based on the value for the additional audio feature,
wherein generating the first visual spatial cue is also based on the calculated value for the second visual feature.

9. The method of claim 1, further comprising rendering the first visual spatial cue in response to the value of the first visual feature being within a predetermined threshold.

10. A method comprising:
for a first auditory spatial cue decoded from a spatialized audio signal,
determining which of a plurality of positions indicated in a map of audio source positions corresponds to the first auditory spatial cue;
calculating a value of a first visual feature based on an audio intensity value indicated in the first auditory spatial cue;
generating a first visual spatial cue based on the calculated value for the first visual feature and the position of the plurality of positions determined as corresponding to the first auditory spatial cue;
communicating the first visual spatial cue for rendering in a graphical user interface in coordination with rendering of the first auditory spatial cue and corresponding audio with an audio output device;
determining a second auditory spatial cue does not correspond to one of the plurality of positions indicated in the map of audio source positions;
determining at least two of the positions corresponding to the second auditory spatial cue;
calculating a value of a second visual feature based on audio intensity values of the at least two positions; and
determining a position of the second auditory spatial cue, wherein the position is not one of the plurality of positions indicated in the map of audio source positions.

11. The method of claim 10, wherein determining the second auditory spatial cue does not correspond to one of the plurality of positions indicated in the map of audio source positions comprises detecting a correlation between at least two points corresponding to the second auditory spatial cue.

12. The method of claim 10, wherein calculating the value of the second visual feature based on audio intensity values of the at least two positions comprises combining an audio intensity value of each of the at least two positions.

13. A system comprising:
a processor; and
a machine-readable medium having a program code executable by the processor to cause the system to,
for a first auditory spatial cue decoded from a spatialized audio signal,
determine which of a plurality of positions indicated in a map of audio source positions corresponds to the first auditory spatial cue,
calculate a value of a first visual feature based on an audio intensity value indicated in the first auditory spatial cue,
generate a first visual spatial cue based on the calculated value for the first visual feature and the position of the plurality of positions determined as corresponding to the first auditory spatial cue,
communicate the first visual spatial cue for rendering the first visual spatial cue around a listener displayed in a graphical user interface in coordination with rendering of the first auditory spatial cue and corresponding audio with an audio output device of the listener, and
synchronize communicating of the first visual spatial cue for rendering with communicating the first auditory spatial cue for rendering;
wherein the communication of the first visual spatial cue for rendering and the communication of the first auditory spatial cue for rendering are synchronized using buffering.

14. The system of claim 13, further comprising the machine-readable medium having the program code to cause the system to render a graphical representation of the map of audio source positions, wherein the graphical representation comprises dots, lines, arcs, or other two-dimensional or three-dimensional representations.

15. The system of claim 13, wherein the program code to communicate the first visual spatial cue for rendering in the graphical user interface comprises the program code causing the graphical user interface to update a graphical representation of the map of audio source positions based, at least in part, on the first visual spatial cue.

16. The system of claim 13, wherein the spatialized audio signal comprises multi-channel audio and the program code to determine which of the plurality of positions indicated in the map of audio source positions corresponds to the first auditory spatial cue comprises the program code determining a channel indicated in the first auditory spatial cue and determining which of the plurality of positions corresponds to the channel.

17. The system of claim 13, wherein the spatialized audio signal comprises object-based audio and the program code to determine which of the plurality of positions indicated in the map of audio source positions corresponds to the first auditory spatial cue comprises the program code determining spatial information from metadata decoded from the spatialized audio signal and determining the corresponding position based on the metadata indicated in the first auditory spatial cue.

18. A non-transitory, computer-readable medium having instructions stored thereon that are executable by a computing device to perform operations comprising:
- for a first auditory spatial cue decoded from a spatialized audio signal,
- determining which of a plurality of positions indicated in a map of audio source positions corresponds to the first auditory spatial cue;
- calculating a value of a first visual feature based on an audio intensity value indicated in the first auditory spatial cue;
- generating a first visual spatial cue based on the calculated value for the first visual feature and the position of the plurality of positions determined as corresponding to the first auditory spatial cue;
- communicating the first visual spatial cue for rendering in the first visual spatial cue around a listener displayed a graphical user interface in coordination with rendering of the first auditory spatial cue and corresponding audio with an audio output device of the listener; and
- synchronizing communicating of the first visual spatial cue for rendering with communicating the first auditory spatial cue for rendering, wherein the communication of the first visual spatial cue for rendering and the communication of the first auditory spatial cue for rendering are synchronized using buffering;
- wherein the spatialized audio signal comprises object-based audio and the instructions for determining which of the plurality of positions indicated in the map of audio source positions corresponds to the first auditory spatial cue comprises instructions for determining spatial information from metadata decoded from the spatialized audio signal and determining the corresponding position based on the metadata indicated in the first auditory spatial cue.

19. The non-transitory, computer-readable medium of claim 18, further comprising instructions to perform operations comprising rendering a graphical representation of the map of audio source positions.

20. The non-transitory, computer-readable medium of claim 18, wherein the spatialized audio signal comprises multi-channel audio and the instructions for determining which of the plurality of positions indicated in the map of audio source positions corresponds to the first auditory spatial cue comprises instructions for determining a channel indicated in the first auditory spatial cue and which of the plurality of positions corresponds to the channel.

21. The non-transitory, computer-readable medium of claim 18, further comprising instructions to:
- determine that a second and third auditory spatial cue decoded from the spatialized audio signal correspond to a phantom audio source;
- calculate a second value of the first visual feature for the phantom audio source based, at least in part, on audio intensity values indicated in the second and third auditory spatial cues;
- generate a second visual spatial cue based on the second value for the first visual feature and a position corresponding to the phantom audio source; and
- communicate the second visual spatial cue for rendering in the graphical user interface in coordination with rendering of the second and third auditory spatial cues and corresponding audio with the audio output device.

* * * * *